United States Patent [19]

Tronel

[11] 4,003,019
[45] Jan. 11, 1977

[54] PARAMETER DISPLAY AND ALARM INSTALLATION FOR MOTOR-DRIVEN VEHICLES

[76] Inventor: Roger Philippe Tronel, Residence du 14 Juillet, 42300 Roanne, France

[22] Filed: Dec. 3, 1974

[21] Appl. No.: 529,059

[30] Foreign Application Priority Data

| Dec. 3, 1973 | France | 73.43638 |
| Dec. 3, 1973 | France | 73.43639 |
| July 5, 1974 | France | 74.24764 |

[52] U.S. Cl. .................. 340/52 F; 340/201 R; 307/10 R
[51] Int. Cl.² ........................................ B60Q 1/54
[58] Field of Search ............ 340/52 R, 52 F, 181, 340/184, 201 R, 203, 412, 413, 415; 307/10 R

[56] References Cited

UNITED STATES PATENTS

| 3,626,367 | 12/1971 | Howard | 340/52 F |
| 3,651,454 | 3/1972 | Venema et al. | 340/52 F |
| 3,742,447 | 6/1973 | Sognefest et al. | 340/52 F |
| 3,866,166 | 2/1975 | Kerscher et al. | 340/52 F |

*Primary Examiner*—Alvin H. Waring
*Attorney, Agent, or Firm*—Hubbell, Cohen, Stiefel & Gross

[57] ABSTRACT

A parameter display and alarm installation for a motor-driven vehicle, comprises a revolution counter device, a speedometer device associated with a general mileage recorder and a trip recorder, said revolution counter and speedometer devices comprising each a signal generator associated with a rotating element of the vehicle, an electronic transfer device having a predetermined duration of its "open" condition and adapted to receive the signals emitted by the related signal generator and to transmit said signals to at least one decoding device which transforms said signals with a view to displaying the same in a digital form, said installation further comprising at least one alarm circuit associated with said revolution counter and speedometer devices and adapted to indicate by an acoustic and/or optical signal any condition wherein the rotational speed of the motor of the vehicle and/or the speed of the vehicle exceed a respective predetermined value; preferably the installation further comprises means for indicating the level of fuel in the reservoir associated with the motor of said vehicle, for indicating the pressure of the lubricant used in said motor and for indicating the temperature of the cooling liquid of said motor, said installation further comprising alarm means adapted to be actuated when the respective predetermined limit values of said lubricant pressure and of said cooling liquid temperature are exceeded.

10 Claims, 5 Drawing Figures

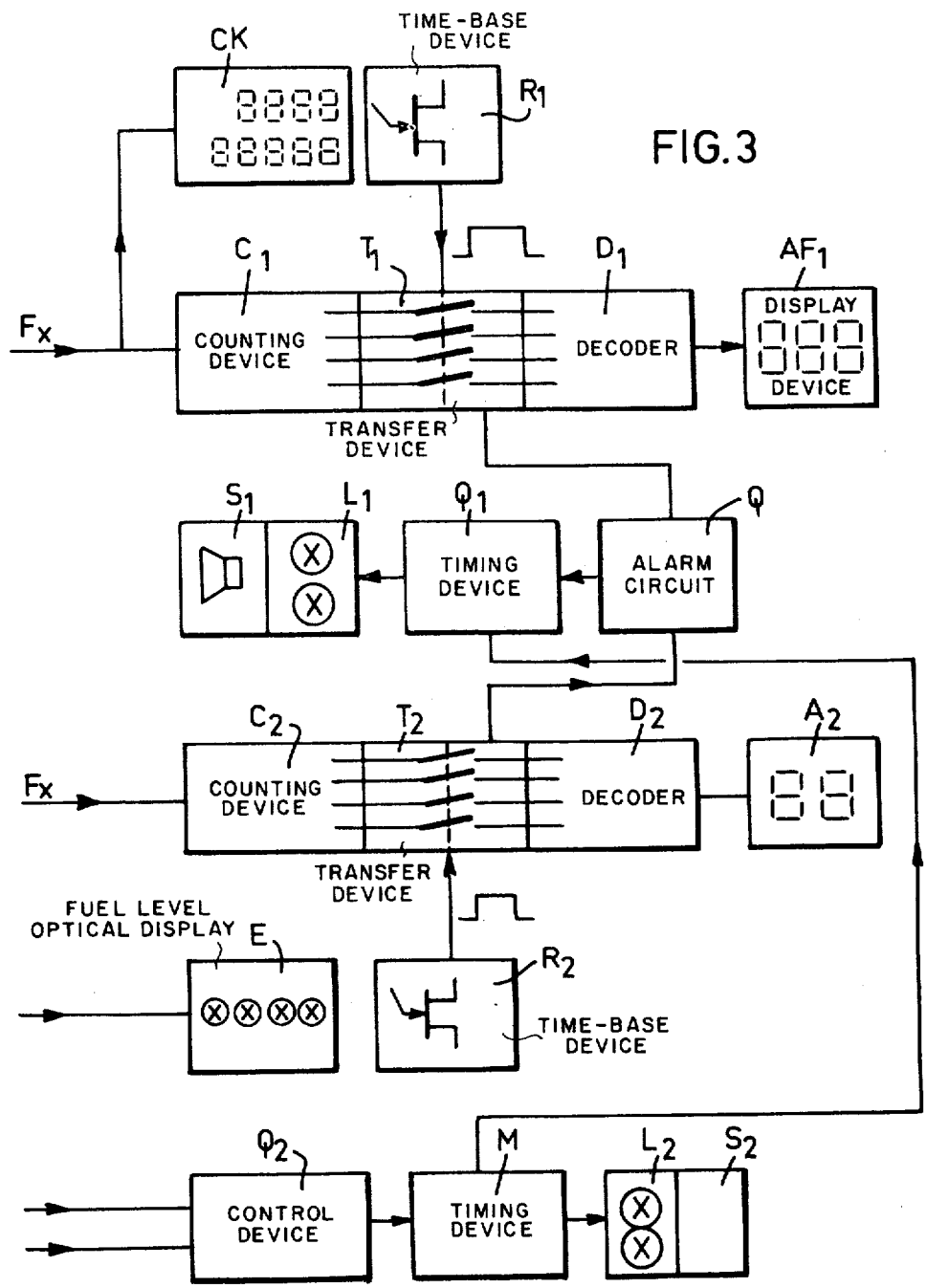

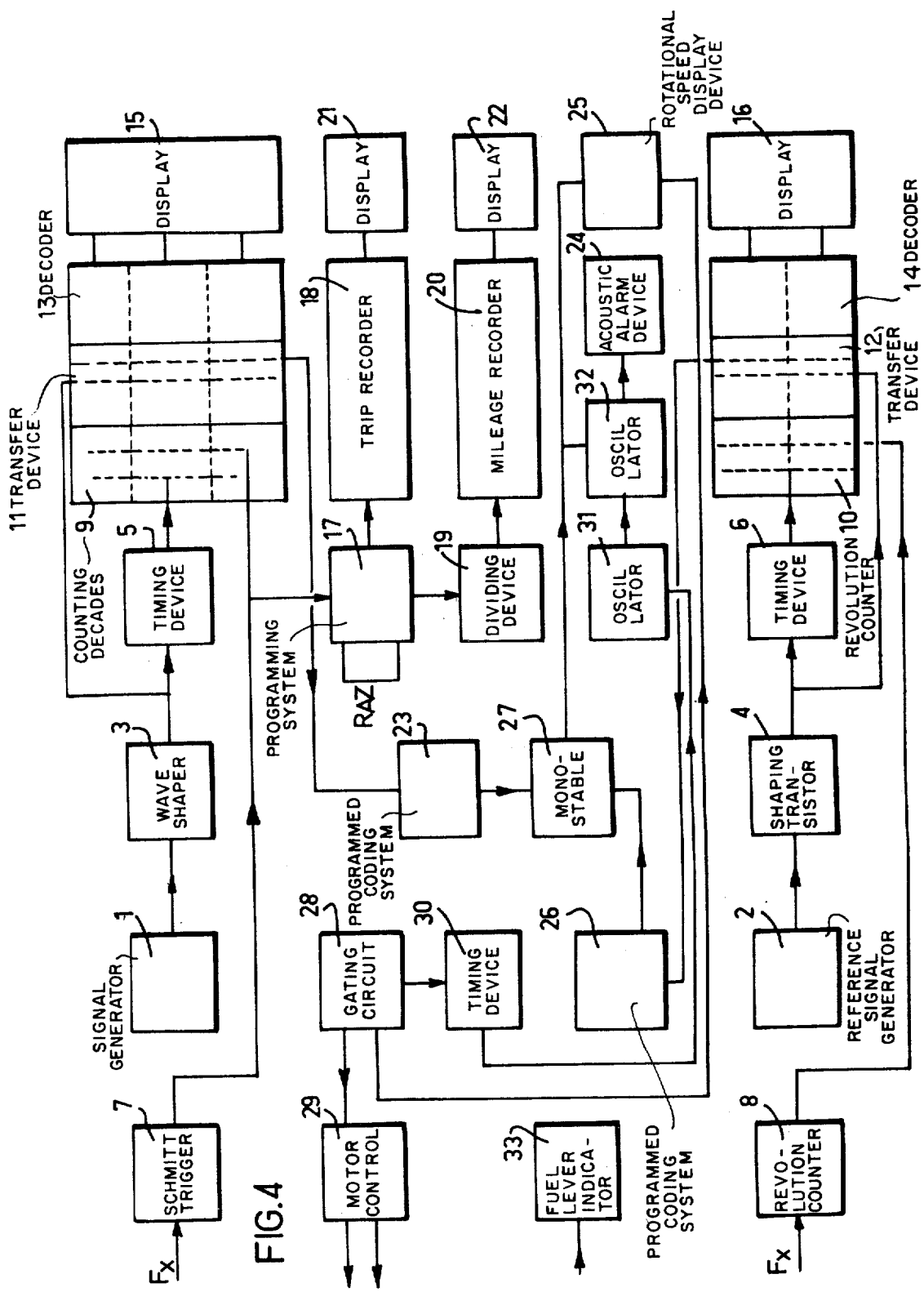

PARAMETER DISPLAY AND ALARM INSTALLATION FOR MOTOR-DRIVEN VEHICLES

The instant invention is related to a parameter display and alarm installation for motor-driven vehicles, adapted to display a plurality of operating parameters and to initiate an alarm signal when at least one of said parameters exceeds a predetermined limit value.

Known installations of the above-defined type comprise complicated, bulky and expensive mechanisms and/or circuits.

The instant invention is aimed at providing a parameter display and alarm installation which is efficient, simple in construction, comparatively cheap and which requires only a minimum of space, said installation being adapted to be easily mounted on a vehicle, even on an existing vehicle, i.e. on a vehicle which has not been provided originally with such installation.

It is another object of the instant invention to provide an installation of the kind described hereinabove which does not use any complicated mechanisms or complicated circuitry.

The installation according to the present invention comprises a revolution counter device, a speedometer device asscociated with a general mileage recorder and a trip recorder, said revolution counter and speedometer devices comprising each a signal generator connected to a revolving element of the vehicle, an electronic transfer device having a predetermined opening time and adapted to receive the signals emitted by the associated signal generator and to transmit said signals to at least one decoding device which transforms the received signal with a view to indicating the same in the form of a digital display, said installation further comprising at least one alarm circuit associated with said revolution counter and speedometer devices and adapted to indicate by an acoustic and/or optical signal any condition wherein the rotational speed of the motor of the vehicle and/or the speed of the vehicle has exceeded a predetermined value.

In one embodiment of the instant invention the parameter display and alarm installation also comprises means for indicating the level of the fuel in the reservoir of the vehicle, means for indicating the pressure of the lubricant used in the motor of the vehicle, and/or means for indicating the temperature of the cooling liquid used in said motor, the above-mentioned indicating means being associated, if desired, with alarm means for indicating any condition wherein said level of the fuel, said pressure of the lubricant and/or said temperature of the cooling fluid has exceeded a predetermined value.

The following description illustrates, with reference to the appended drawings, how the instant invention may be carried out; it should be well understood that this description is given by way of example only, and is not to be construed as having a limiting character.

FIG. 3 is a simplified wiring diagram showing one embodiment of the installation according to the instant invention.

FIG. 4 is a wiring diagram showing an installation according to the invention in its entirety.

Figure 1:
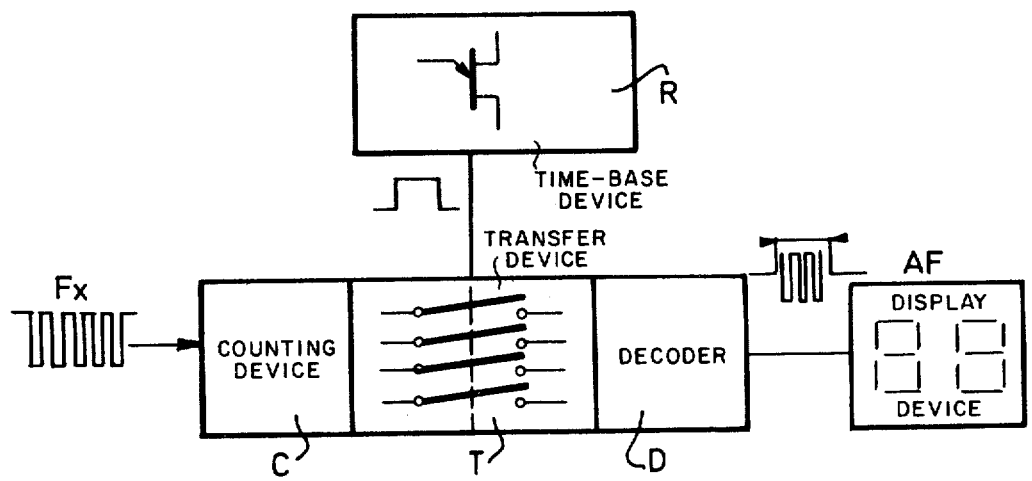
FIG. 1 shows schematically the fundamental principle of the revolution counter and the speedometer of the installation according to the present invention.

The speedometer device and the revolution counter device of the installation according to the instant invention are based on the same counting principle which is illustrated in FIG. 1. This Figure shows that the active condition, i.e. the duration of the active condition of a electronic transfer device T is monitored by a reference signal produced by a time-base device R; thus, said transfer device allows binary signals resulting from the counting of signals $Fx$ produced by a signal generator to be transmitted to a decoder D, with a view to displaying said signals on a display device AF in a digital form. The counting times of signals $Fx$ correspond to the resting times of the electronic transfer device T.

As far as the speedometer device is concerned the resting time of the associated transfer device must be adjusted in a manner which takes into account the developed length of the periphery of the driving wheels of the vehicle, so that the displayed digital value corresponds to the real speed of the vehicle.

Figure 5:
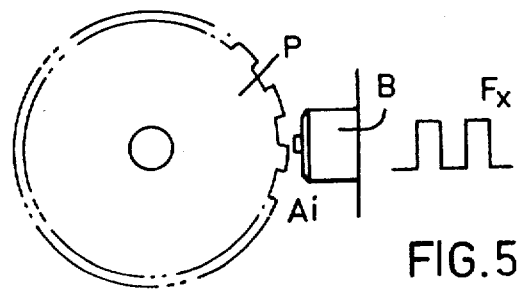
FIG. 5 is a schematic view of a signal generator.

The input signals $Fx$ of the speedometer are produced by a signal generator such as the one shown in FIG. 5. This signal generator is connected to the tachometric output shaft of the gear box associated with the motor of the vehicle, or to any convenient rotating element of the motor or the vehicle which allows to take into account the developed length of the periphery of the driving wheels of the vehicle. The signal generator is arranged in such a manner that the generator produces one signal or impulse for each revolution of the driving wheels of the vehicle. These signals may be produced, as shown in FIG. 5, by a generator adapted to count the teeth of the toothed wheel or of a similar element.

The resulting time of the transfer device is determined on the basis of the following equation:

$$\frac{\frac{X \times Y}{10} \times 3600}{1000} = Z; \quad \left( \text{counting time } t = \frac{Z}{X} \right).$$

where X is the number of signals $Fx$ per second, Y is the developed length of the periphery of a driving wheel and Z is the speed of the vehicle in kilometers/hour.

As far as the revolution counter device is concerned the resting time of the electronic transfer device has to be adjusted in accordance with the type of the motor driving the vehicle in question (two-stroke engine or four-stroke engine), so that the signals Fx produced by a generator associated with the ignition contact breaker of the motor or with any other convenient element the rotational speed of which is equal or proportional to the rotational speed of the motor may be counted correctly.

Of course, as well for the speedometer device as for the revolution counter device the duration of the active condition of the associated electronic transfer device has to be conveniently determined so as to avoid any scintillation between any successive displays of digital indications.

The mileage recorders associated with the speedometer device of the installation according to the present invention are fed by the same signal generator as the one transmitting the signals $Fx$ to the input of said speedometer device.

These signals Fx are applied to three dividing devices of the type n/10, the outputs of which are associated with a multiple input gate and may be monitored in accordance with a predetermined program taking into account the developed length of the periphery of the driving wheels of the vehicle.

Due to this program signals are obtained the duration of which is equal to that corresponding to a distance of 100 m of travel of the vehicle. When the capacity of this program is exceeded the device produces an information fed to three different circuits, to wit:

1. The counting circuit of the trip recorder.
2. The zero-setting circuit of the three n/10 dividing devices of the program selector, which allows new data to be injected into this program. When the capacity of the program is exceeded, this causes a change in the state of the outlet of the multiple inlet gate. These changes are counted by a mileage counting system. The mileage counter in question then indicates the distance covered by the vehicle, this distance being indicated on the one hand by 100 meter increments, and on the other hand by kilometer increments. A manually operated zero-setting device allows the trip recorder to be re-set at will.
3. A 1:10 dividing circuit which transforms the received information and feeds the same to a general mileage recorder. The capacity of this mileage recorder is unlimited in theory, however in practice a capacity of 99 999 kn (i.e. a five digit display capacity) is preferred. Naturally, this general mileage recorder does not comprise any manual zerosetting device.

The displayed count is memorized permanently by a feeding system comprising a supplementary accumulator. When the displayed count is erased only the display is erased, but the memory device is maintained in its operating condition.

The speedometer device comprises a plurality of programs related to limit values of authorized speeds. These programs are established in accordance with existing traffic rules related to speed limitation. An unlimited number of programs of this kind may be provided; however, preferably four programs are used, which allow compliance with the conditions of traffic as they presently exists. When the speed of the vehicle exceeds the authorized value, acoustical and/or optical alarm means which may comprise means for digital indication of the excess value are actuated and maintained in an active condition during several seconds.

The revolution counter of the installation according to the invention comprises also an acoustic or similar alarm system which is preferably associated with an optical indication means. This alarm system is operated when the rotational speed exceeds dangerously a predetermined maximum limit value.

The instant installation may also comprise an automatic system for controlling the pressure of the lubricant of the motor and the temperature of the cooling liquid of said motor. In this case an alarm device is provided and adapted to be actuated when the lubricant pressure or the cooling liquid temperature attains a value in excess of predetermined respective limit values. This alarm device may comprise an acoustical alarm means as well as a convenient system adapted to stop the motor in case the user (i.e. the driver of the vehicle) fails to react to the alarm.

The installation according to the instant invention may also comprise a system for optical indication, or similar indication, of the level of the fuel in the reservoir of the motor, wherein a plurality of optical signals indicate different fuel levels in said reservoir. This system may be arranged in such a manner that when the reservoir is entirely filled all the indicating elements are shut off, these indicating elements being actuated one by one as the fuel level decreases. When this arrangement is used, the user of the vehicle is informed that the fuel level has reached a predetermined minimum when all of the indicating means are actuated, i.e., in the case of optical indicating means, when all of the luminous indicators are lit.

For controlling the lubricant pressure and the temperature of the cooling water or similar cooling liquid, as well as for the control of the fuel level in the reservoir, convenient transmitting devices known per se may be used, and no supplementary elements are necessary.

Means may also be provided within the scope of the instant invention for adjusting the luminous intensity of the display means associated with the revolution counter and the speedometer devices (including the general mileage recorder and the trip recorder), this adjustment being effected automatically with reference to the ambient luminosity at the location of said display means.

The simplified diagram of FIG. 3 shows one embodiment of the installation according to the invention and the wiring of the various elements thereof.

The speedometer device comprises an electronic transfer device T the opening time of which is defined by a time-base device $R_1$ and which allows signals Fx to be transmitted from a counting device $C_1$ to a decoder $D_1$. These signals Fx are also derived towards integrating mileage counters Ck. From the outlet of decoder $D_1$ these signals are then transmitted to digital display circuit $AF_1$ with a view to direct reading by a user. A multiple program alarm circuit Q is adapted to actuate through a timing device $Q_1$ acoustic and/or luminous alarm means $S_1$, $L_1$ for informing the user when the speed of the vehicle exceeds a predetermined value.

As shown in FIG. 3 the revolution counter also comprises an electronic transfer device $T_2$ the opening time of which is monitored by a time-base device $R_2$ and which allows signals Fx to pass from a counter $C_2$ to a decoder $D_2$. The programmable alarm circuit Q also serves to inform the user of the vehicle by acoustic and/or optical means $S_1$, $L_1$ connected to circuit Q through a timing circuit $Q_1$, when the rotational speed of the motor exceeds a predetermined value.

A multi-stage optical display device E constantly indicates the level of the fuel in the reservoir of the vehicle.

Programs are fed to a device $Q_2$ for controlling the pressure of the lubricant and the temperature of the cooling liquid of the motor. This device $Q_2$ is connected through a timing device M to acoustic and/or optical alarm means $S_2$, $L_2$ adapted to inform the user of the vehicle when said pressure and/or said temperature exceeds a predetermined value; said devices $Q_2$ and M further comprise means adapted to stop the motor of the vehicle a few moments after the actuation of the acoustic and/or optical alarm means mentioned hereinabove.

As shown in FIG. 4 which represents a wiring diagram of an installation according to the instant invention in its entirety, a reference signal generator 1 (which may be, for instance, of the unijunction transistor type) produces a signal of adjustable periodicity; this signal is put in shape, at 3, by a transistor adapted to monitor the opening of the electronic transfer device 11 and a monostable timing device 5. This monostable device produces zero-setting signals for the counting decades at 9.

The revolution counter of the instant invention is based on the same principle. A reference signal generator 2 (which may also be of the type UJT) produces a signal of adjustable periodicity which is transmitted to a shaping transistor 4. The output of this transistor serves to monitor the opening of a transfer device 12 and a monostable timing device 6. This monostable device 6 produces zero-setting signals for the counting decades of the revolution counter, at 10.

The signals $Fx$ produced by the respective signal generators are calibrated by a low-pass filter and a Schmitt trigger 7 (speedometer device) and 8 (revolution counter device), which allows signals with steep flanks (cf. FIG. 2) to be obtained, said signals acting on the counting systems 9 and 10, respectively. For each monitoring impulsion produced by the related reference signal generators 1, 2 the associated transfer device 11, 12, respectively, is put into its active condition. Consequently, the counting information corresponding to the various decades are transmitted to the decoders 13 and 14, respectively, where they are decoded, and then displayed at 15 and 16, respectively.

As regards the speedometer device, the signals transmitted from the related signal generator are applied:

1. To the first counting decade which when exceeding the number 9 feeds the first decade, the latter feeding in turn the third decade when the number 99 is exceeded;

2. To the programming system 17 which feeds the trip recorder 18 and the general mileage recorder 20. A dividing device adapted to divide by ten, which is designated by reference numeral 19, converts into kilometers the information corresponding to the hundred meter increments covered by the vehicles; this is necessary with a view to obtaining an accurate operation of the general mileage recorder. The counting, memory and decoding circuits of the mileage recorders are based on the scanning technique, which allows for a more complete integration in the related circuit, the corresponding data being displayed at 21 and 22. The memories are maintained permanently in an active stage by a supplementary accumulator, which is independent from the battery associated with the motor of the vehicle.

As regards the speedometer device, the respective outputs of the three counting systems 11 are applied to a programmed coding system shown at 23 which is adapted to operate, through the intermediary of a timing monostable 7, a low frequency oscillator 32 which produces an acoustic signal at 24, when a predetermined speed is exceeded. The value of the excess speed is displayed in digital form at 25.

As concerns the revolution counter device, the outputs of the two counting systems 12 of the rotational speed of the motor are applied to a multiple input gate so as to feed a programmed coding system at 26 which serves to operate the monostable 27 and to actuate the acoustic alarm device 24 through the intermediary of oscillator 32, as well as a selective rotational speed display device 25.

As far as the system for controlling the lubricant pressure and the cooling liquid temperature is concerned, the various states of electronic gates select, through a device 28, the active state or the inactive state of the motor on which acts a device 29 through a timing device 30. The inactive state (stop) of the motor may be obtained by interrupting the feeding circuit which feeds the necessary high voltage current to the combustion chamber of the motor; of course any other convenient means may also be utilised for causing the motor to stop when the lubricant pressure and cooling liquid temperature control system detects a condition wherein said pressure and/or said temperature exceed a predetermined limit value, or values. When the motor is stopped upon detection of such an undesirable condition, one or more optical indicators 25 will light up and thus indicate the cause of the misfunctioning (i.e. undesirable value of the lubricant temperature or undesirable value of the cooling liquid temperature), and then operate an oscillator 31 having a very low frequency, for modulating oscillator 32 and for emitting an acoustic signal at 24 which is different from the signal indicating that the speed of the vehicle or the rotational speed of the motor has exceeded the predetermined respective value.

The operation of the system 33 for indicating the level of fuel in the reservoir of the vehicle is based on the measurement of a voltage applied at the ends of a resistance to which an electric current is applied.

The voltage differences across said resistance are a function of the fuel level and thus allow Zener diodes to be triggered. The characteristic curves of these diods present different "Zener trigging bends" and thus allow to actuate successively optical indicating means which correspond to different values of the fuel level.

The speedometer device and the revolution counter device of the installation according to the instant invention operate as follows: During the resting period (of a predetermined duration) of the related electronic transfer device the counting signals are not transmitted to the "binary/digital" decoder; however when the transfer device is in its active condition, these signals are transmitted to the decoder and are then displayed in digital form. The rear flank of the monitoring signal (cf. FIG. 2) emitted by each transfer device immediately generates, through the action of a timing monostable, a comparatively reduced time constant, which is on the order of a micro-second, the zero-setting pulse thus emptying the counting decades of their preceding information so as to allow a new counting to be effected.

The numerical display devices are of the type having seven digits; other display devices than those envisaged here may be used, for instance display devices which utilise the principle of display by scanning. As indicated hereinabove the luminous intensity of the display is preferable adjusted automatically by a convenient system which is monitored by a photo-electric cell.

FIG. 5 shows one embodiment of the signal generators associated, respectively, with the speedometer device and the revolution counter device of the instant installation. As shown in the Figure, the teeth of a rotary toothed wheel P made of ferromagnetic material successively pass in front of a coil B provided with a magnet $Ai$ to generate in the windings of said coil pulses which constitute the related input signals $Fx$.

The toothed wheel preferably is driven, in the case of the signal generator associated with the revolution counter device, by the driving shaft of the ignition contact breaker of the motor, and in the case of the signal generator associated with the speedometer device, by the tachometric output shaft of the gear box of the vehicle.

Figure 2:
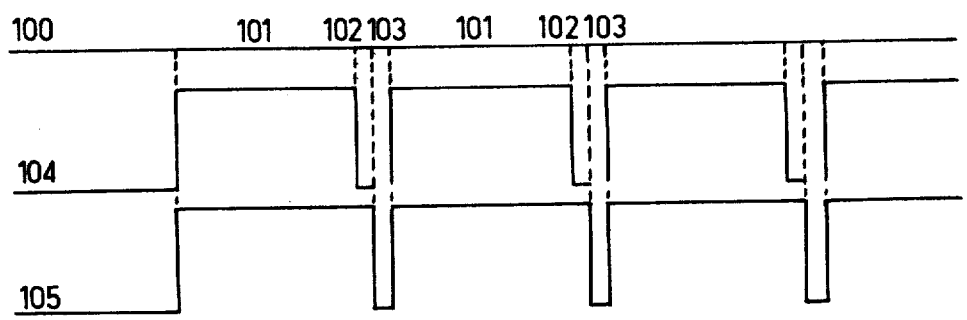
FIG. 2 is a graph representing the various control signals.

FIG. 2 is a graph representing the various monitoring signals used in the instant installation. In this Figure, reference numerals 100 designates the successive operating cycles which comprise each a counting period 101, an inactive or rest period 102 and a zero-setting period 103. Reference numeral 104 designates the monitoring signals of the electronic transfer devices, and reference numeral 105 designates the decade zero-setting signals.

It will be clear from the above description that the installation according to the instant invention presents inter alia the following important advantages: The operation of the installation is efficient and accurate. Apart from the signal generators the installation does not comprise any mechanical parts, more particularly no flexible shaft of the type used in conventional tachometric devices is required. The described installation may easily be mounted on any type of vehicle, including electrically driven vehicles.

Obviously, the instant invention is by no means limited to the features disclosed in the description hereinabove and shown in the appended drawings; numerous variants and modifications may be envisaged by any person skilled in the art, without departing from the scope and spirit of the instant invention.

What is claimed is:

1. A parameter display and alarm installation for a motor-driven vehicle having a gear-box associated with the vehicle motor, said gear-box including a tachometric output shaft the rotational speed of which is proportional to the speed of the vehicle, said installation comprising:
    a revolution counting device and a speedometer device, a general mileage recorder and a trip recorder operatively connected to said counting device and speedometer device;
    said speedometer device comprising a signal generator associated with said tachometric output shaft for producing binary signals in accordance with the rotational speed of said output shaft;
    said vehicle motor including a rotating element, the rotational speed of which is proportional to the rotational speed of said motor;
    said revolution-counting device comprising a second binary signal generator operatively connected to said rotating element;
    an electronic transfer device connected to said first and second signal generators and having an "active" condition of predetermined duration for receiving the signals emitted by the related signal generator and for transmitting said signals to at least one decoding device for transforming said signals into a digital form and an "inactive" condition;
    said installation further comprising at least one alarm circuit associated with said revolution counter and speedometer devices for indicating when the rotational speed of the motor of the vehicle exceeds a predetermined value and for indicating when the speed of the vehicle exceeds a predetermined value.

2. The installation of claim 1, wherein said vehicle further includes a fuel reservoir for said motor, and said motor is lubricated by a liquid lubricant and is cooled by a liquid coolant, and wherein said installation further comprises means for permanently indicating the level of fuel in said reservoir; means for indicating the pressure of the lubricant in said motor; and means for indicating the temperature of the liquid coolant for said motor, said installation further comprising alarm means for indicating when the respective predetermined limit values of said lubricant pressure and of said cooling liquid temperature are exceeded.

3. The installation of claim 1, further comprising an ignition circuit breaker for said motor, said ignition circuit breaker including a driving shaft; and wherein said signal generator of the revolution counter device is driven by the driving shaft of said ignition circuit breaker.

4. The installation of claim 1, wherein the signals emitted by each signal generator are counted during the negative condition of the associated electronic transfer device.

5. The installation of claim 1, further comprising means for optically displaying said digital form signals, and a device including a photoelectric cell for controlling the luminous intensity of the displayed digital signals in response to ambient light intensity.

6. A parameter display and alarm installation for a motor-driven vehicle having a gear-box associated with said motor, said motor including an element which rotates at a speed proportional to the rotational speed of said motor, a fuel reservoir, a liquid cooling system and a pressurized lubricating system; said gear-box being provided with a tachometric output shaft, the rotational speed of which is proportional to the speed of the vehicle, said installation comprising a revolution counting device and a speedometer device associated with a general mileage recorder and a trip recorder, said speedometer device comprising a signal generator associated with said tachometric output shaft and adapted to produce signals in accordance with the rotational speed of said output shaft, said revolution counting device comprising a signal generator associated with said rotating element; an electronic transfer device having an "open" condition of predetermined duration, a decoding means for transforming signals generated by said signal generators into digital form, means for permanently recording said digital form signals, means for connecting said electronic transfer device to said decoding means for transmitting said signals to said decoding means; said installation further comprising at least one alarm circuit associated with said revolution counter and speedometer devices for indicating by a sensory perceptive signal when the rotational speed of the motor of the vehicle and the speed of the vehicle exceed a respective predetermined value, said installation further comprising means for permanently indicating the level of fuel in said reservoir and for permanently indicating the pressure of said lubricant and for permanently indicating the temperature of the cooling liquid of said motor, said installation further comprising alarm means adapted to be actuated when the respective predetermined limit values of said lubricant pressure and of said cooling liquid temperature are exceeded.

7. The installation of claim 6, wherein said means for indicating the fuel level comprise a plurality of optical indicating means, a like plurality of Zener diodes having different triggering tensions and being connected to respective of said optical indicating means which are lit successively by said Zener diodes for indicating various fuel levels, and a fuel level sensing element comprising a rheostat for monitoring said Zener diodes.

8. A parameter display and alarm installation for a motor-driven vehicle having a gear-box associated with said motor, said installation including a general mileage recorder and a trip recorder, said gear-box including a tachometric output shaft, the rotational speed of which is proportional to the speed of the vehicle, said installation comprising a revolution counting device and a speedometer device associated with said general mileage recorder and said trip recorder, said speedometer device comprising a signal generator associated with said tachometric output shaft for producing signals in accordance with the rotational speed of said output shaft, said motor including a rotating element, the rotational speed of which is proportional to the rotational speed of said motor, said revolution counting device comprising a signal generator associated with said rotating element of said motor, an electronic transfer device having an active state of predetermined duration and an inactive state, means connecting said signal generators to said electronic transfer device to said decoding device, said installation further comprising at least one alarm circuit associated with said revolution counter and speedometer devices for producing an sensory alarm signal when the rotational speed of the motor of the vehicle or the speed of the vehicle exceed a respective predetermined value, said motor including a fuel reservoir, a pressurized lubricant system and a liquid cooling system, said installation further comprising means for permanently indicating the level of fuel in the reservoir, and for permanently indicating the pressure of the lubricant, and for permanently indicating the temperature of the cooling liquid, said installation further comprising alarm means adapted to be actuated when the respective predetermined limit values of said lubrican pressure and of said cooling liquid temperature are exceeded, said signals emitted by each signal generator being counted during the inactive state of the associated electronic transfer device, while the displaying of said signals in digital form is effected during the active state of said transfer device.

9. The installation of claim 1, wherein said alarm circuit produces an optical alarm, and further comprising a device including a photoelectrical cell for controlling the luminous intensity of the displayed optical alarm as a function of the ambient light.

10. The installation of claim 8, wherein said alarm circuit produces an optical alarm, and further comprising a device including a photoelectrical cell for controlling the luminous intensity of the displayed optical alarm as a function of the ambient luminosity.

* * * * *